April 16, 1968     L. BEAR     3,378,082

WINDMILL AND POT HOLDER

Filed Sept. 12, 1966     2 Sheets-Sheet 1

INVENTOR.
LOREN BEAR
BY *Ma Moody*
ATTORNEY

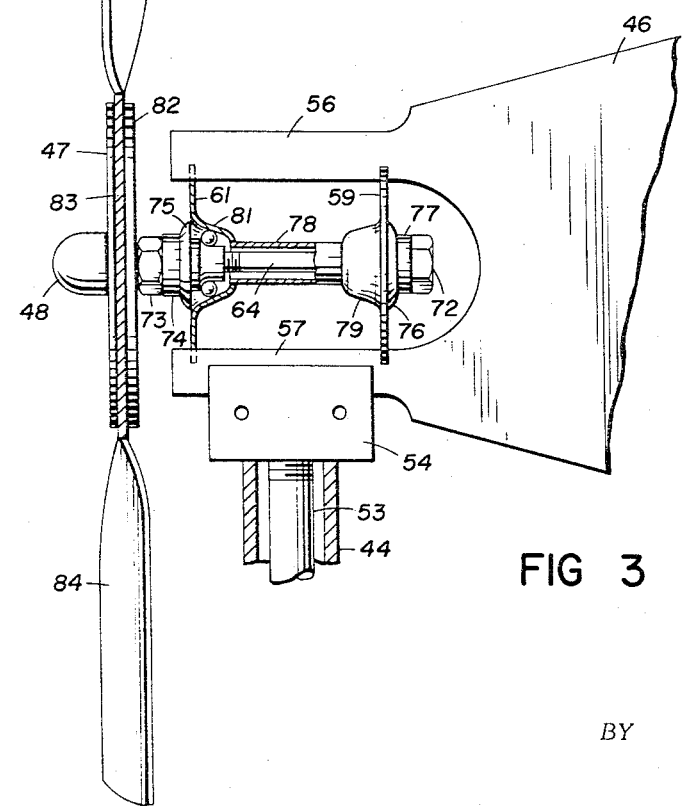

3,378,082
WINDMILL AND POT HOLDER
Loren Bear, 1293 34th St., NE.,
Cedar Rapids, Iowa. 52402
Filed Sept. 12, 1966, Ser. No. 578,845
1 Claim. (Cl. 170—77)

ABSTRACT OF THE DISCLOSURE

An ornamental windmill and weathercock capable of holding flower pots having very low frictional drag on the turbine so that very light wind can move it.

---

This invention relates in general to windmills and, in particular, to an ornamental windmill and weathercock capable of holding flower pots.

It is an object of this invention to provide an easily driven windmill and weathercock which has pot holders to provide an ornamental assembly.

Another object is to provide a bearing-mounted windmill which turns easily.

Yet another object is to provide a novel assembly method for a windmill.

A feature of this invention is found in the provision for a supporting tower formed with supports which also hold flower pots upon which is mounted a windmill and weathercock to indicate the direction and velocity of the wind.

Further features, objects and advatnages of this invention will become apparent from the following description and claims when read in view of the drawings, in which;

FIGURE 2 is a detailed view of the top of the windmill, and;

FIGURE 3 is a partial sideview of the top of the windmill.

Figure 1:
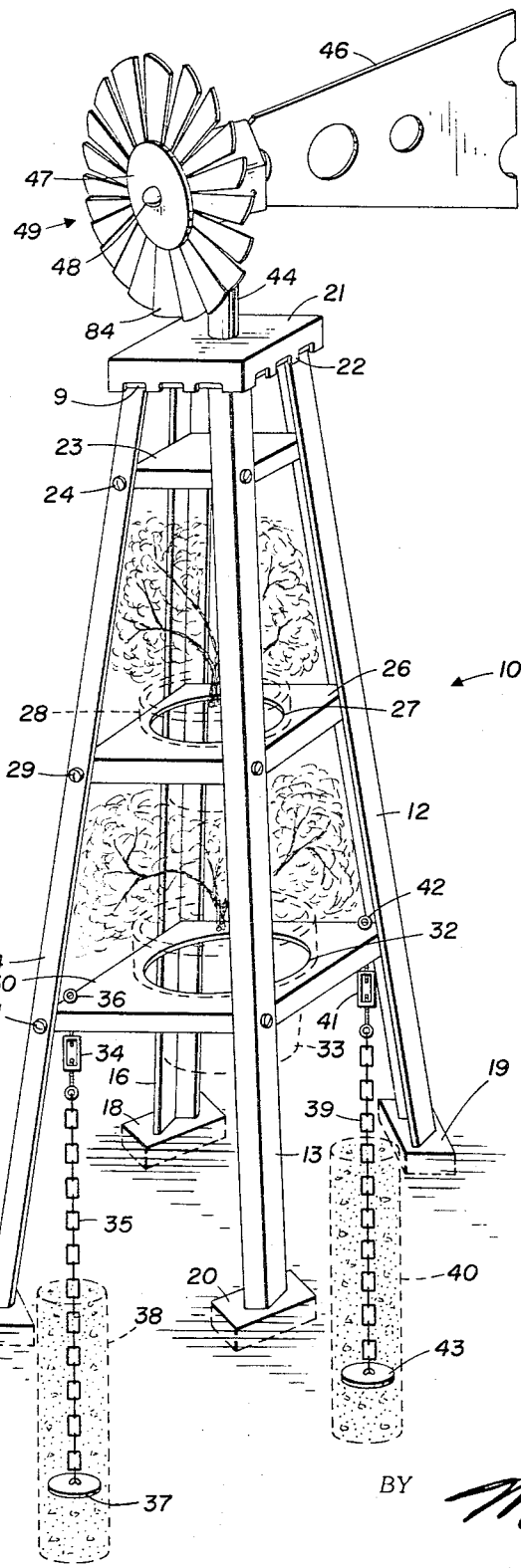
FIGURE 1 is a perspective view of the windmill of this invention.

FIGURE 1 illustrates the windmill tower 10 with a windmill and weathercock 49 mounted on its top. The tower 10 consists of four angle iron legs 12, 13, 14 and 16 which have their lower ends resting on blocks or bricks 17, 18, 19 and 20 and which are joined by support partitions 9, 23, 26 and 30 which are attached to the legs by nuts and bolts 24, 29 and 31, respectively. Top support partition 9 is attached to the tops of legs 12, 13 and 14 and 16 and a cover plate 21 fits over it. Cover plate 21 has downwardly extending sides 22.

Partitions 26 and 30 are formed with openings 27 and 32 in which flower pots 28 and 33 may be placed. Decorative plants may be planted in pots 28 and 33 for ornamental effect.

Chains 35 and 39 are attached to portion 30. I-bolts 36 and 42 are attached to partition 30 and turnbuckles 34 and 41 are threaded on the I-bolts. The chains 35 and 39 are attached to tower I-bolts that engage the turnbuckles 34 and 41. The lower ends of chains 35 and 39 are attached to plates 37 and 43 and holes are dug into the ground where the chains depend from the tower and these holes are filled with concrete. The turnbuckles 34 and 41 are tightened to tension the chains 35 and 39 to firmly hold the tower 10 to the ground.

A pipe 44 is attached to partition 23 and extends upwardly through cover plate 21 and the top partition 9 under cover plate 21. Windmill and weathercock 49 are supported from the top of pipe 44.

As best shown in FIGURES 2 and 3, the windmill and weathercock 49 consists of a block 54 attached to the top of a rod 53 which extends down into pipe 44. The upper portion of block 54 is formed with a groove into which a portion 57 of weathercock 46 is press fitted. The weathercock 46 is formed with a cutout at its forward edge to leave portions 56 and 57.

A front hub and axle assembly from a bicycle is received between portions 56 and 57. Hubs 59 and 61 are formed with slots 62 and 63 into which portions 56 and 57 are received. Hubs 59 and 61 are joined by bearing holders 79 and 81 and hollow shaft 78. An axle 64 carries bearing retainers 75 and 76 which engage bearings within holders 79 and 81. A washer 77 and nut 72 are mounted on one end of axle 64. A second washer 74 and set nut 73 is received on the other end of axle 64 to hold bearing holder 75. The windmill is formed of two ornamental discs 47 and 82 which fit on either side of a turbine disc 83. Turbine disc 83 is formed into a plurality of vanes 84 by making radial cuts into it and forming the sectors into turbine blades for catching the wind. The discs 47, 82 and 83 are formed with a central opening through which axle 64 extends. A cap nut 48 is threaded on to axle 64 to lock the windmill assembly to the axle.

As best shown in FIGURE 2 a pair of cover plates are attached to block 54 to hold the hubs 59 and 61 in the opening between portions 56 and 57. One holding plate 69 is attached to one side of block 54 by screws 72 and has its upper end 71 bent over the top of portion 56. The second holding plate 66 is attached to block 54 by screws 68 and has its top portion 67 bent over the top of portion 56 and the upper end 71 of plate 69.

The plates 66 and 69 have widths such that they fit between hubs 59 and 61 to hold the hub and bearing assembling to the portions 56 and 57.

In operation, the windmill is easily and quickly assembled and mounted in a suitable location. Windmill and weathercock 49 is placed into pipe 44 by inserting shaft 53 into the pipe. The bearing assembly is greased before assembly and will be lubricated for many years use.

Because of the use of good bearings a very light breeze will turn the windmill and the assembly will weathercock due to the fact that block 54 turns on the top of pipe 44.

It is seen that this invention comprises an ornamental windmill and weathercock which can support plants.

Although it has been described with respect to a preferred embodiment, it is not to be so limited as changes and modifications may be made which are within the full intended scope as defined by the appended claim.

I claim:

1. A windmill and weathercock comprising a supporting tower formed with a plurality of legs and a plurality of horizontal partitions attached to said legs to brace them and at least one of the partitions formed with an opening for receiving a flower pot therein, a hollow pipe attached to the upper partition, a windmill and weathercock mounted on a shaft receivable within the hollow pipe, said windmill and weathercock comprising a block attached to the shaft, a weathervane formed with a bifurcated portion attached to the block, a hub and axle assembly formed with a pair of slots into which the bifurcated portion is received, the hub and axle assembly comprising a front bicycle hub and axle assembly, holding means attached to said block on either side thereof and passing over the hub and axle assembly between the hubs to lock the hub and axle assembly to the block and weathervane and to form a protective and ornamental cover for the hub and axle, a windmill turbine comprising a turbine disc formed with a plurality of vanes and an opening formed in its center through which the axle extends, a pair of ornamental discs with center openings mounted on either side of the turbine disc and the axle extending through them, a cap nut threadedly received on the end of the axle to hold the turbine disc and the ornamental discs together and to the axle, and anchor means comprising chains attached to one of the partitions and attachable to the ground to anchor the tower.

References Cited
UNITED STATES PATENTS

| | | | |
|---|---|---|---|
| 173,449 | 2/1876 | Davies | 170—41 X |
| 546,710 | 9/1895 | Rogers | 170—76 |
| 1,877,622 | 9/1932 | Beard | 170—56 X |

EVERETTE A. POWELL, JR., *Primary Examiner.*